March 17, 1970     H. W. STIER     3,500,522

CUTOFF TOOL HOLDER

Filed March 1, 1967     2 Sheets-Sheet 1

INVENTOR
Henry W. Stier.
BY John D. Mesaros
HIS ATTORNEY

March 17, 1970  H. W. STIER  3,500,522
CUTOFF TOOL HOLDER

Filed March 1, 1967  2 Sheets-Sheet 2

INVENTOR.
Henry W. Stier.
BY John D. Mesaros
HIS ATTORNEY

United States Patent Office 3,500,522
Patented Mar. 17, 1970

3,500,522
CUTOFF TOOL HOLDER
Henry W. Stier, Dearborn Heights, Mich., assignor to Carmet Company, Pittsburgh, Pa., a corporation of New Jersey
Filed Mar. 1, 1967, Ser. No. 619,796
Int. Cl. B26d 1/00
U.S. Cl. 29—96                7 Claims

ABSTRACT OF THE DISCLOSURE

A cutoff tool holder having a generally T-shaped clamping member pivotally supported by and securing a die insert to the support blade. The clamping member has a leg with an enlarged portion cooperating with a mating aperture in the support member for pivotal movement. One arm of the clamping member engages the cutting insert, and the other arm thereof engages a cam member cooperating with the support, rotation of the cam member urging the clamping arm about the pivot point to clamp the cutting insert in place. Reverse rotation of the cam member releases the cutting insert.

BACKGROUND OF THE INVENTION

Cutoff tools for lathes and the like are generally provided with a support blade extending out from a tool block in a cantilevered manner. At the free end of the support blade a cutting insert is disposed in a recess or pocket and the cutting insert must be rigidly secured within this recess. Heretofore, prior art cutoff tools with removable inserts have been limited in the construction thereof by the clamping means available. The support blade is usually very slim as is the cutting insert and, accordingly, ordinary screw means inserted through or cooperating with the support blade lack sufficient strength to retain the cutting insert against the high cutting forces involved in such cutoff tools. One such prior art device provides a clamping member which is fixedly secured to the tool block, the clamping member being provided with an offset arm extending outwardly in line with the support blade and engaging the upper surface of the cutting insert for securing the insert within the recess. With such an arrangement, the tightening of the screw does not transmit a major portion of the downward force to the cutting insert itself. Furthermore, in such a device a carbide or cutting tip is usually brazed to a shank member having similar cross-section in order to provide a larger surface for engagement with the offset arm arrangement.

It is accordingly an object of this invention to provide a new and improved cutoff tool holder which exerts large amounts of restraining forces on the cutting insert.

It is another object of this invention to provide a new and improved cutoff tool holder having a simplified means of assembling and disassembling.

It is a further object of this invention to provide a new and improved cutoff tool holder having a novel clamping member cooperating with the support blade for securing the cutting insert.

It is still another object of this invention to provide a new and improved cutoff tool holder having a novel clamping member pivotally secured to the support blade and cooperating with a threadless cam member to frictionally secure the cutting insert.

It is a still further object of this invention to provide a new and improved cutoff tool holder which utilizes a generally T-shaped clamping member which is pivotally secured to the support blade by the leg thereof with one arm cooperating with a cam member to provide the necessary pivotal movement and the other arm frictionally engaging the cutting insert.

An additional object of this invention is to provide a new and improved cutoff tool holder which utilizes a very slender clamping member substantially supported by the support blade, the clamping member being able to exert large amounts of restraining force on the cutting insert.

SUMMARY OF THE INVENTION

The foregoing objects are accomplished by providing a generally T-shaped clamping member, the leg thereof having a neck portion and an enlarged portion at the base of the leg, the enlarged portion matingly engaging a key-hole shaped open-ended aperture adjacent the free end of the support blade of the cutoff tool holder. One arm of the clamping member engages the upper surface of a cutting insert disposed in a recess in the free end of the support blade. A cam member matingly engages a grooved-out portion of the support blade adjacent to and beneath the other arm of the clamping member, the cam member being adapted to engage the other arm of said clamping member whereby rotation of said cam member urges the other arm upwardly to consequently urge the clamping arm downwardly to rigidly secure said insert.

BRIEF DESCRIPTION OF THE DRAWINGS

Other objects, features and advantages of the invention will become obvious on reading the following detailed description when taken in conjunction with the accompanying drawings in which.

DESCRIPTION OF THE PREFERRED EMBODIMENT

Figure 1:
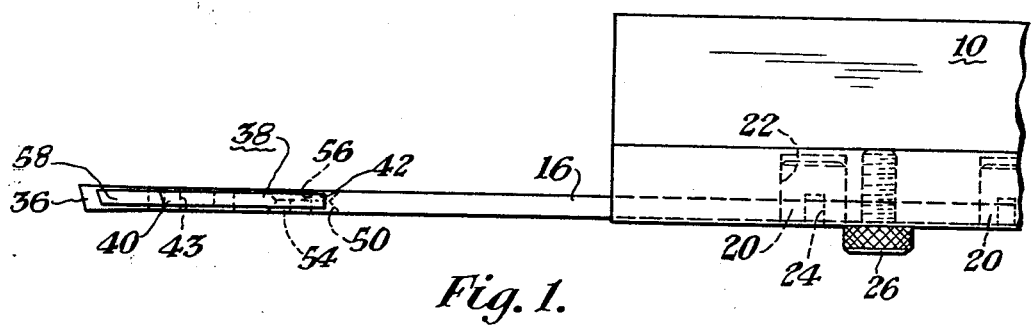
FIGURE 1 is a side elevational view of the cutoff tool holder according to the invention.

Referring now to the drawings, and particularly to FIG. 1, there is shown a cutoff tool holder according to the invention wherein a tool block 10 has a wide groove 12 of shallow depth (see FIG. 3) milled out of one of the side surfaces thereof. The groove 12 has a tapered end surface 14 at the lower end thereof. A relatively thin and wide generally bar shaped support blade 16 has the lower edge 18 thereof tapered for insertion into the groove 12 in slidable mating engagement with the tapered end surface 14. The support blade 16 is secured to the tool block 10 at the lower end thereof by the tapered mating surfaces and at the upper end thereof by cam locks 20. The cam locks 20 are recessed in the tool block 10 in apertures 22 adjacent the upper end surface of the groove 12 and are adapted for communication with the upper edge of the support blade 16 upon the rotation of the cam locks by means of a wrench inserted into the recessed heads 24 of the cam locks 20. After proper positioning of the support blade 16, one or more cap screws 26 may be inserted through an aperture in the support blade to threadably engage one or more threaded apertures 28 located in the groove 12. The free end of the support blade has a recess 30 which has a base 32 and a V-shaped female groove therein and a vertical shoulder 34 (see also FIG. 3). Positioned within the recess 30 is a cutting insert 36 having a V-shaped male base for mating engagement with the V-shaped female groove in base 32 of recess 30. The carbide insert 36 abuts against the vertical shoulder 34 when properly positioned.

A clamping member 38 having a planar generally T-shaped configuration has a clamping arm 40, a cam following arm 42 and a leg including a neck portion 43 and an enlarged portion 44 of a generally circular cross-sectional configuration.

Figure 2:
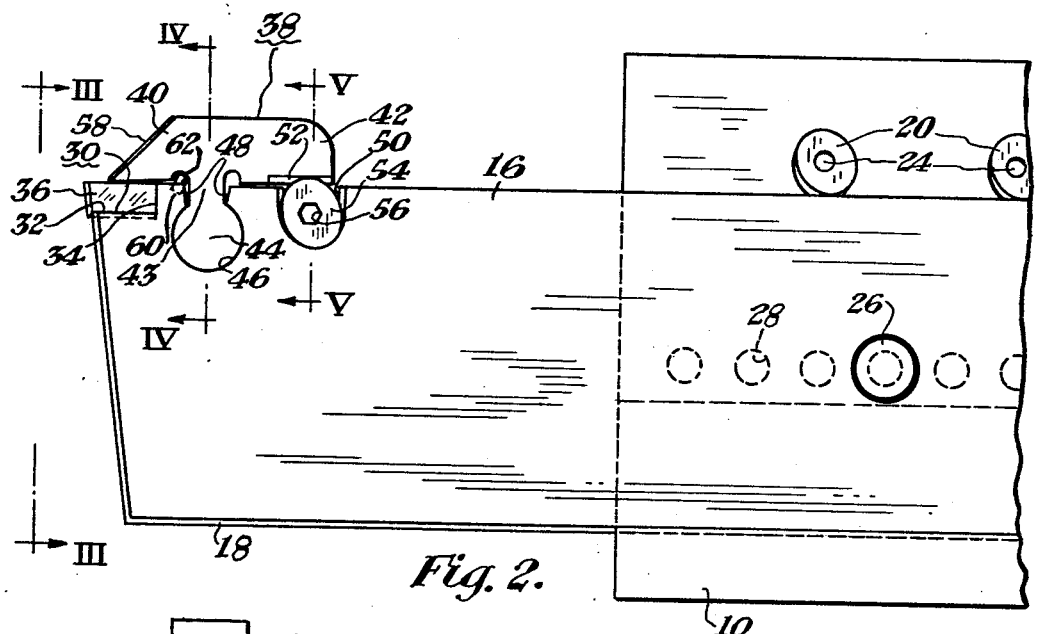
FIG. 2 is a plan view of the cutoff tool holder of FIG. 1.
Figures 3, 4, 5:
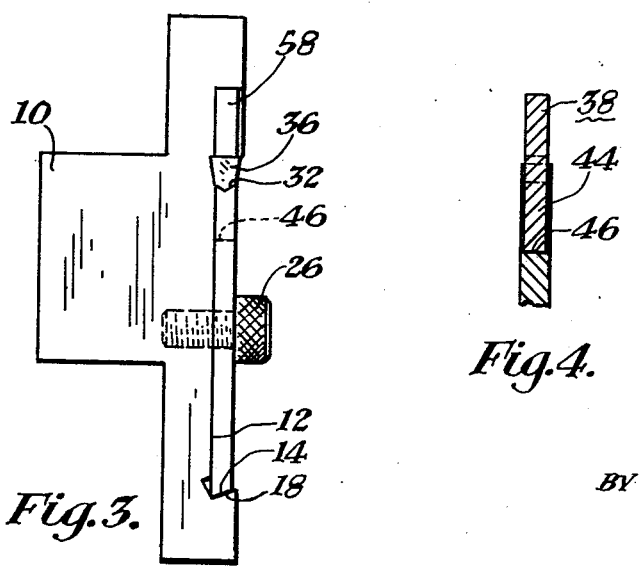
FIG. 3 is an end view of the cutoff tool holder taken on line III—III of FIG. 1.
FIG. 4 is a partial sectional view taken on line IV—IV of FIG. 1.
FIG. 5 is a partial sectional view taken on line V—V of FIG. 1.

An inverted key-shaped open-ended aperture 46 is located in the support blade 16 adjacent to and rearwardly of recess 30, the main portion of the aperture 46 being of the same configuration as the enlarged leg portion 44 of clamping member 38. The aperture 46 is slotted upwardly to provide an opening communicating with the upper edge of support blade 16. The opening is provided with upwardly tapered surfaces 48. The clamping member 38 has its enlarged leg portion 44 inserted within aperture 46 (FIGS. 1 and 4) and is adapted for limited pivotal movement therewith, the limits of movement being defined by the engagement of the neck portion 43 with the tapered surfaces 48. When properly positioned, the lower edge of the clamping arm 40 abuts against the upper surface of carbide insert 36. Immediately beneath the rearward portion of the cam following arm 42 there is located a groove 50 having a V-shaped male bearing surface. The lower edge 52 of the cam following arm 42 has a similarly V-shaped male bearing surface. An eccentric cam lock 54 has a V-shaped female groove about the periphery thereof, the cam lock 54 being inserted within the groove 50 with the V-shaped groove of the cam lock 54 mating with the V-shaped bearing surfaces of the groove 50 and the lower edge 52 of the cam following arm 42 (FIGS. 1, 2 and 5). A recessed opening 56 is provided in the cam lock 54 for insertion of a wrench therein. The dimensions of the clamping member 38 are such that upon rotation of the cam lock 54, the lower edge 52 of the cam following arm 42 is urged upwardly to provide counterclockwise pivotal movement of the clamping member 38 about the enlarged leg portion 44 to transmit the pressure from the cam lock to downward pressure on the carbide insert 36 thereby securely locking the insert 36 to place. The clamping arm 40 is provided with an inclined edge 58 extending angularly upwardly and rearwardly from the upper surface of the insert 36 to thereby function as a chip-breaker.

An aperture 60 is located in the upper edge of the support blade 16 and is positioned at an angle thereto, the aperture 60 being located adjacent the tapered surface 48 intermediate neck 43 of the leg of the clamping member 38 and the recess 30. A spring 62 is positioned within the aperture 60 and biases the clamp member 38 in a clockwise direction against the action of the cam lock 54.

The assembly of the clamping means is as follows:

With the insert 36 removed and the spring 62 in aperture 60, the clamp member 38 has the enlarged leg portion 44 positioned within the aperture 46 in the support blade 16. The clamping arm 40 is then urged downwardly, while the cam lock 54 is positioned within groove 50; the cam following arm 42 is then lowered by the force of the spring 62 until the lower edge 52 of arm 42 engages the V-groove of cam lock 54; with the cam lock 54 rotated to its low side, the cutting insert 36 is then slid into position by means of the V-shaped groove in the base 32 of the recess 30 communicating with the V-shaped base of the insert 36; with the insert 36 resting against the vertical shoulder 34 of recess 30, the cam lock 54 is then rotated until the high side urges against the lower edge 52 of cam following arm 42 to secure the carbide insert 36 by means of clamping arm 40. Any subsequent changing of the insert 36 merely entails partial rotation of the cam lock 54, removal of the insert 36, and replacement with a new insert 36.

Figure 6:
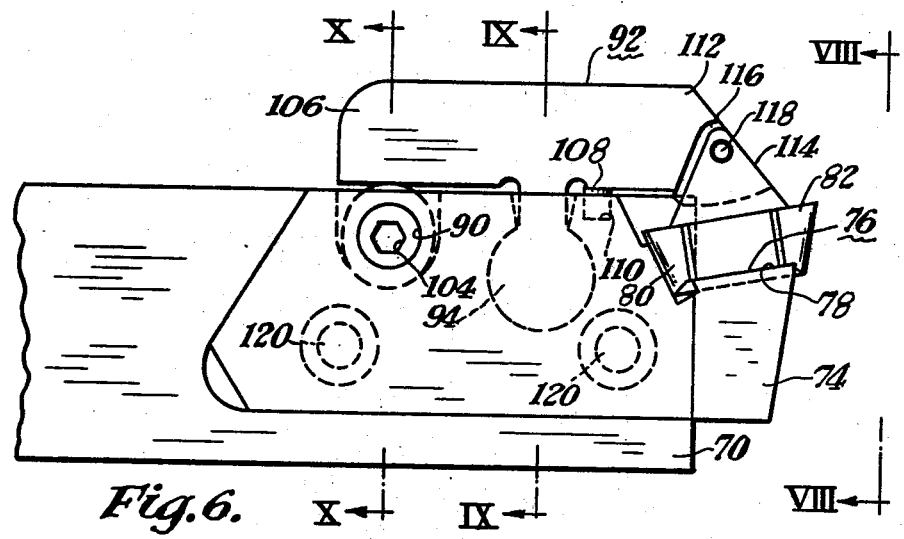
FIG. 6 is a side elevational view of a modified form of the invention which is used when double ended cutting inserts are applied.
Figure 8:
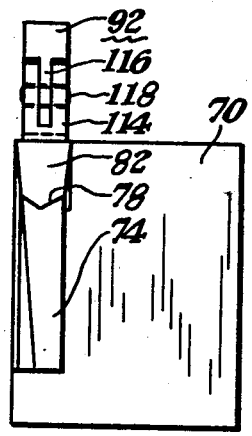
FIG. 8 is an end view of the cutoff tool holder taken on lines VIII—VIII of FIG. 6.
Figure 9:
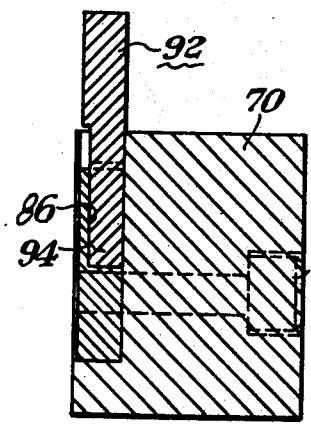
FIG. 9 is a sectional view taken on line IX—IX of FIG. 6.

FIG. 6 shows a modified embodiment of the cutoff tool holder of FIG. 1 for use with a double-ended cutting insert. In this embodiment a basically rectangular tool holder body 70 has a grooved-out portion 72 along one side thereof. An insert support 74 is configured for mating engagement with the groove 72 with the free end extending out beyond the end of the tool holder body 70. In FIGS. 6 and 8 it can be seen that the free end of the insert support 74 has a recess generally designated 76 having an inclined base portion 78 and an upwardly inclined shoulder portion 80. The base portion 78 is provided with a V-shaped female groove for mating engagement with the V-shaped male base of a double-ended cutting insert 82. The insert 82 of the present embodiment has a pair of cutting edges 84 of generally trapezoidal configuration at opposite ends thereof and is adapted to be indexable upon the wearing out or breakage of one of the cutting edges. The shoulder 80 and the base 78 of the recess 76 are adapted for mating engagement with the insert 82 according to the configuration of the insert 82. The inner surface of the insert support 74 is provided with a keyhole-shaped grooved-out portion 86, and a second grooved-out portion 88 disposed rearwardly of the grooved-out portion 86, the purposes of which will become obvious.

Figure 7:
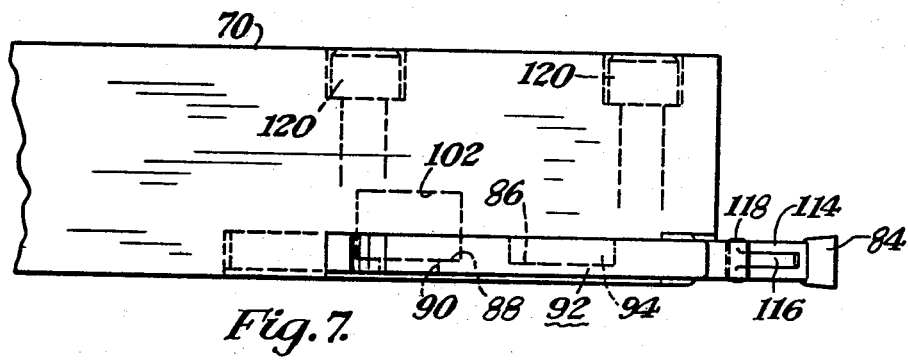
FIG. 7 is a plan view of the cutoff tool holder of FIG. 6.
Figure 10:
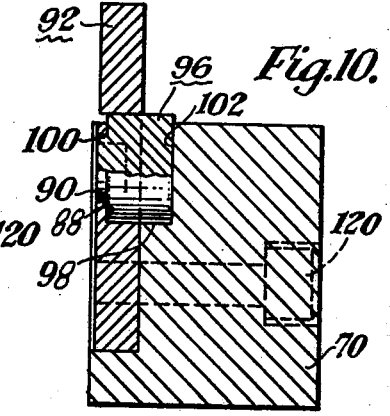
FIG. 10 is a sectional view taken on line X—X of FIG. 6.

An aperture is located in the insert support 74 and communicates with the grooved-out portion 88. A generally T-shaped clamping member 92 has the enlarged leg portion 94 thereof disposed for pivotal movement within the grooved-out portion 86 of insert support 74. The cam member 96 has an eccentric bearing surface 98 and a reduced diameter stud portion 100. The stud portion 100 is positioned through aperture 90, while the bearing surface 98 rotates within the grooved-out portion 88 of insert support 74 and a conjoint mating grooved-out portion 102 in tool holder body 70 (FIGS. 7 and 10). Rotation of the cam member 96 by means of insertion of a wrench in recessed opening 104 in the stud portion 100 of cam member 96 provides a force against the lower edge of the cam following arm 106 of clamping member 92. Due to the method of retention of the cam member 96 and the clamping member 92 in this embodiment, the bearing surfaces need not be grooved. Spring means 108 are inserted in aperture 110 in insert support 74 immediately beneath the clamping arm 112 of clamping member 92 adjacent the grooved-out portion 86 of insert support 74 to provide a bias force against the force of the cam member 96.

A triangular shaped chip-breaker 114 is slotted, the width of the slot being such that the chip-breaker 114 can be inserted over the reduced thickness free end portion 116 of clamping arm 112. A pin 118 is inserted through aligned apertures in the bifurcated portion of chip-breaker 114 and end portion 116 of clamping arm 112 to permit limited pivotal movement of chip-breaker 114.

The pin 118 is secured only to end portion 116 and chip-breaker 114 fits loosely on pin 118. During assembly of the cut-off tool holder, spring means 108 are inserted in aperture 110 of insert support 74, and clamping member 92 has the enlarged portion 94 thereof positioned in grooved-out portion 86 of the insert support 74. It should be mentioned at this point that the upper walls of grooved-out portion 86 are tapered upwardly to permit limited pivotal movement of clamping member 92. Cam member 96 is then positioned with stud portion 100 thereof extending through aperture 90 and the partial assembly is positioned in groove 72 of tool holder body 70. Cap screws 120 are inserted through suitable apertures in the tool holder body 70 to engage threaded apertures in the insert support 74 to thereby secure the insert support 74 to the tool holder body 70. With the cam member 96 in its low position, the insert 82 is positioned in recess 76 with the V-shaped base of the insert 82 matingly engaging the V-shaped groove of base 78 of recess 76 and the rearward portion of insert 82 matingly abuts against inclined shoulder 80 of recess 76. The cam member 96 is then rotated to its high side to urge chip-breaker 114 downwardly, thereby permitting the base of chip-breaker 114 to engage the top surface of insert 82 thereby securing insert 82. The loose fit of pin 118 is provided to permit the arcuate surface of clamping arm 112 to bear directly against the slot surface of chip-breaker 114 and provides direct transmission of force to the chip-breaker 114. Similarly, as in the first embodiment, reversal of the insert 82 or replacement thereof is accomplished by simple partial rotation of the cam member 96 to its low side to permit removal of the insert 82 and replacement thereof, and simple rotation of cam member 96 to its high side to clamp the insert in place.

In summary, it can be seen that the tool holder of this invention provides a clamping member having a relatively small thickness which is readily adapted for use in a slender support blade. Furthermore, screw means are not needed and tremendous restraining forces can be applied to the cutting insert for retaining the insert on the support blade.

While there have been shown and described preferred embodiments, it is to be understood that various adaptations and modifications may be made without departing from the spirit and scope of the invention.

What is claimed is:

1. A tool holder for a cutting member comprising; a support member having one end thereof adapted for securing to a tool block, said support member having a recess in the free end thereof, said recess having a base portion and transversely extending shoulder portion; a cutting member insertable within said recess, the base portion and shoulder portion of said recess being disposed for abutting engagement with said cutting member; a clamping member pivotally carried by said support member, said clamping member having a clamping arm and a cam following arm, said clamping arm being adapted for engaging a surface of said cutting member; rotatable cam means at least partially carried by said support member, said cam means being adapted for actuating said cam following arm, the parts being so arranged and so configured that rotation of said cam means to its high position urges said clamping arm in a direction to secure said cutting member within said recess, said cam means having a V-shaped bearing surface about the periphery thereof, said cam means mating with said support member in a cut away portion having a complemental V-shaped surface on the internal edges of said cut away portion, said cam means engaging the edge of said cam following arm adjacent said cam means, said edge of said cam following arm having a V-shaped bearing surface complemental with said cam means bearing surface whereby the engagement of said V-shaped surfaces assist in retaining said clamping member on said support member.

2. Apparatus according to claim 1 including bias means cooperating with said support member and said clamping arm to urge said cam following arm into engagement with said cam means.

3. Apparatus according to claim 1 wherein said clamping member is generally T-shaped, the leg thereof having an enlarged portion pivotally engaging a mating aperture in said supporting member, said clamping member being approximately the same thickness as said support member, and said clamping member having generally planar side surfaces.

4. Apparatus according to claim 3 wherein said support member has an inverted key-hole shaped cut away portion and the leg off said clamping member has a neck portion and an enlarged base portion, the enlarged base portion engaging said cut away portion for pivotal movement of said clamping member with respect to said support member, the limits of movement being defined by the engagement of said neck portion with the tapered edges of said cut away portion.

5. A tool holder for a cutting insert according to claim 1 including a clamping foot pivotally mounted on said clamping arm substantially at the end thereof having a base portion adapted to engage said cutting member over a substantial extent thereof.

6. Apparatus according to claim 5 wherein the end of said clamping arm has an arcuate bearing surface and said clamping foot exhibits a comparably arcuate bearing surface, said clamping foot being loosely pivotally mounted to said clamping arm, said clamping arm arcuate bearing surface directly engaging said clamping foot arcuate bearing surface when said cam means is rotated to its high position thereby directly transferring the force of clamping through said cutting member to said foot across said arcuate surfaces.

7. Apparatus according to claim 6 wherein said clamping foot has a bifurcated portion adapted to be received over said clamping arm and is pivotally mounted on said arm.

References Cited

UNITED STATES PATENTS

| 1,090,810 | 3/1914 | Amborn | 29—96 |
| 1,104,980 | 7/1914 | Fry | 29—96 |
| 1,480,987 | 1/1924 | Britt | 29—96 |
| 1,484,332 | 2/1924 | Jaques | 29—96 |
| 2,964,833 | 12/1960 | Navkov | 29—95 |
| 3,158,921 | 12/1964 | Yost | 29—96 |

FOREIGN PATENTS 989,133   4/1965   Great Britain.

HARRISON L. HINSON, Primary Examiner